Nov. 9, 1948.  J. E. BUXTON  2,453,657
ENGINE STARTING GEARING
Filed Nov. 27, 1946  2 Sheets-Sheet 1
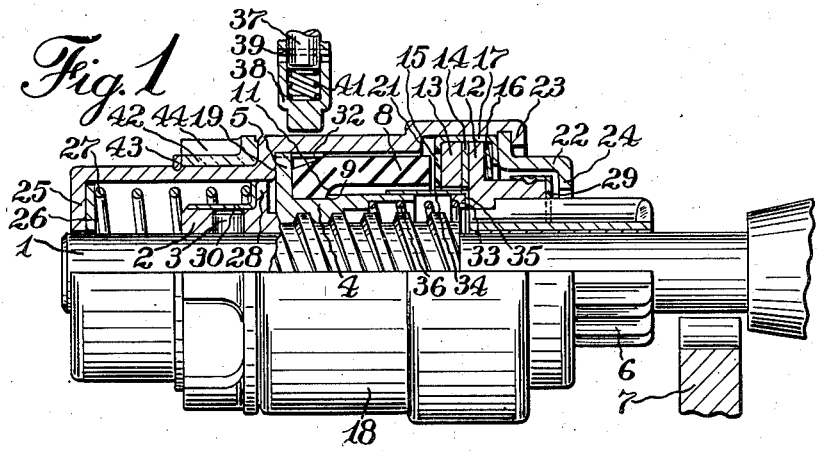
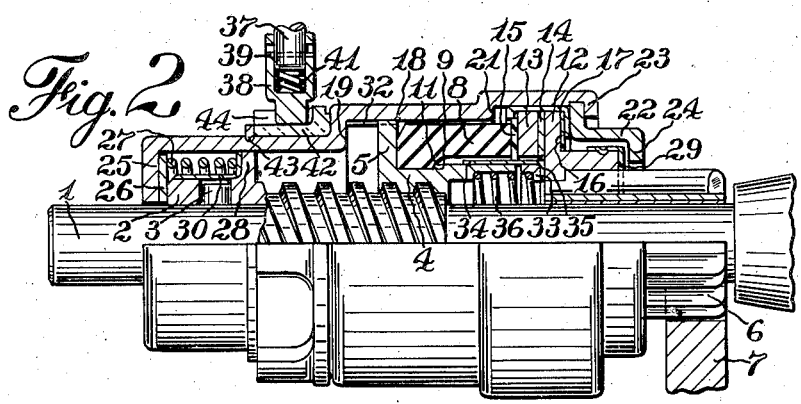
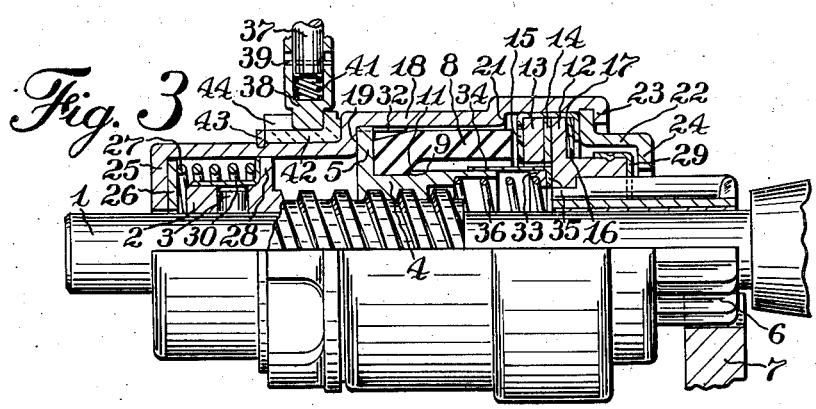
WITNESS:
Esther M. Stockton
INVENTOR.
James E. Buxton
BY
Clinton S. James
ATTORNEY Nov. 9, 1948.                J. E. BUXTON                 2,453,657
                         ENGINE STARTING GEARING
Filed Nov. 27, 1946                                    2 Sheets-Sheet 2
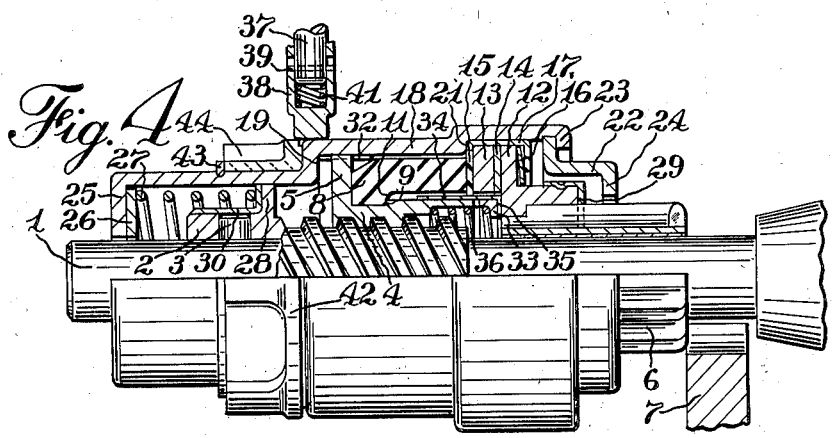
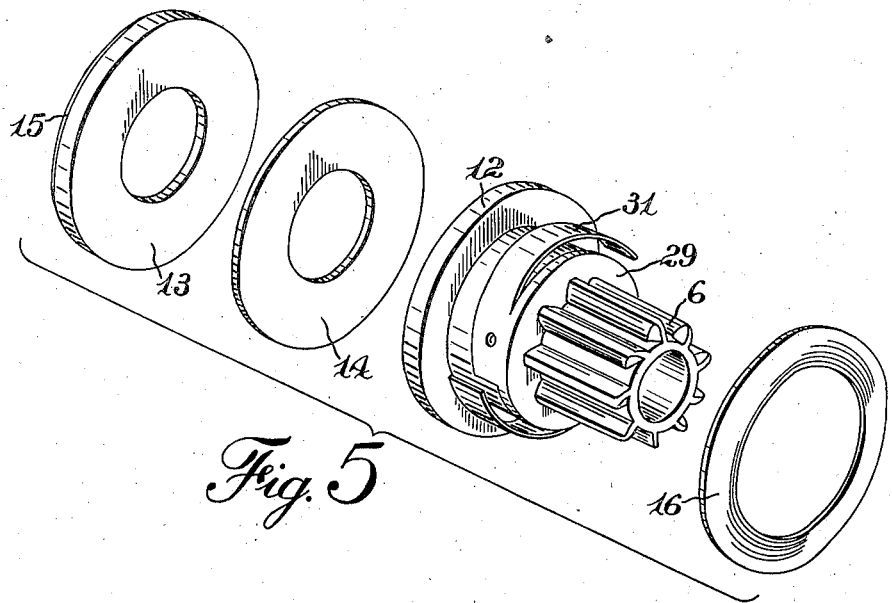
WITNESS:                                              INVENTOR.
                                                    James E. Buxton
                                                  BY
                                                     Clinton S. James
                                                          ATTORNEY Patented Nov. 9, 1948

2,453,657

UNITED STATES PATENT OFFICE 2,453,657

ENGINE STARTING GEARING

James E. Buxton, Elmira, N. Y., assignor to Bendix Aviation Corporation, a corporation of Delaware Application November 27, 1946, Serial No. 712,545

7 Claims. (Cl. 74—7)

The present invention relates to engine starter gearing, and more particularly to a starter drive incorporating an automatically engageable yielding driving connection.

It is an object of the present invention to provide a novel starter drive of the above character which is dependable in operation while being simple and economical in construction.

It is another object to provide such a device which incorporates an overrunning connection and means for reliably controlling its action.

It is another object to provide such a device having a self-energizing friction clutch mechanism with means for limiting the torque capacity of the clutch and causing it to slip when overloaded so as to protect the drive from excessive stress.

It is another object to provide such a device embodying means under the control of the operator for maintaining the engagement of the drive with a member of the engine to be rotated thereby.

Further objects and advantages will be apparent from the following description taken in connection with the accompanying drawings in which:

Fig. 1 is a side elevation partly in section of a preferred embodiment of the invention showing the parts in normal or idle position;

Fig. 2 is a similar view showing the parts in cranking position;

Fig. 3 is a similar view showing the parts in the positions assumed when the engine fires and overruns the drive;

Fig. 4 is a similar view showing the positions of the parts when a tooth of the pinion abuts a tooth of the engine gear during the meshing operation; and Fig. 5 is a detail in perspective of the pinion and clutch elements shown in disassembled relation.

In Fig. 1 of the drawing there is illustrated a power shaft 1 which may be the extended armature shaft of a starting motor not illustrated. A screw shaft 2 is fixedly mounted on the power shaft by any suitable means such as a cross pin 3, and has threaded thereon a control nut 4 having a radial flange 5. A pinion 6 is slidably journalled on the power shaft 1 for longitudinal movement into and out of mesh with a gear 7 of an engine to be started, and means for actuating the pinion from the control nut are provided comprising an elastic connection, which is disengageable to permit overrun, and a friction clutch connection which is adapted to slip on overload.

The elastic connection comprises a cylindrical block 8 of elastically deformable material such as rubber which is seated at one end on the exterior of the control nut 4, bearing against the flange 5; and preferably retained against longitudinal movement with respect to the control nut by means of an abutment 9 on the control nut cooperating with a shoulder 11 in the rubber block.

The friction clutch connection comprises a flanged clutch member 12 fixedly mounted on the pinion 6 in any suitable manner, and a driving clutch ring 13 mounted adjacent thereto preferably with the interposition of a friction ring 14 of suitable material such as brass or bronze. The driving clutch member 13 may be provided with a facing 15 of rubber or other suitable material having a high coefficient of friction, in position to be engaged by the end of the rubber block 8, so as to prevent slippage between the rubber block and driving clutch member when they are pressed together during the cranking operation. The driving clutch member 13 and driven clutch member 12 are held in frictional engagement by means of a dished spring washer 16, the clutch assembly being united by means of an annular clamping member 17.

A barrel member 18 is arranged to enclose the control nut 4 and the driving connection to the pinion 6, and is provided with a shoulder 19 forming an abutment for the flange 5 of the control nut, and a shoulder 21 forming a stop for the friction clutch assembly 12, 13, 14. An annular member 22 is rigidly fixed in the open end of the barrel as indicated at 23, and has an inwardly directed flange 24 forming an abutment for the driven clutch member 12 and consequently providing a stop for the pinion 6 to which said clutch member is attached. The opposite end of the barrel 18 is provided with an inwardly extending flange 25 which is adapted to engage the end of the screw shaft 2, preferably with the interposition of a thrust washer 26, and thereby limit the travel of the pinion into mesh with the engine gear 7.

Means normally holding the parts in demeshed or idle position is provided in the form of an anti-drift spring 27 bearing at one end against the thrust washer 26 and at its other end against a thimble 30 seated on the end of the screw shaft 2 so as to retain the pin 3, and bearing against a radial flange 28 of the screw shaft.

Means forming a frictional drag connection between the pinion 6 and annulus 22 of barrel 18 is provided in the form of a cup-shaped member 29 (Fig. 5) of suitable spring material fixedly mounted on the driven clutch member 12 and having spring arms 31 arranged to frictionally bear against the interior of said annulus. Preferably, the radial portion of the drag member 29 serves as a thrust washer between the annulus 22 and the end of the driven clutch member 12.

In order that the frictional control of the nut 4 by the pinion through the drag member 29 may be positively transmitted to the nut, the flange 5 of the nut may be splined in the interior of the barrel 18 as indicated at 32.

Means for limiting the pressure applied to the clutch members 12, 13 by the rubber block 8 in order to limit the torque capacity of the clutch is provided comprising a thrust ring 33 seated against the driven clutch member 12 and forming an abutment for the end of the control nut 4. Preferably a thimble 34 is arranged to surround the ring 33 and the adjacent portion of the control nut 4 and has an inwardly extending flange 35 forming a thrust washer between the ring 33 and the driven clutch member 12. A spring 36 is interposed between the ring 33 and the control nut in order to maintain the thimble 35 in engagement with the driven clutch member.

Manually operable means are provided for holding the pinion 6 in mesh with the engine gear 7 as long as the starting system is energized. As here shown, this means is in the form shown in Patent No. 2,444,109, issued June 29, 1948, assigned to the assignee of the present application, and comprises a latch plunger 37 having a telescopic extension 38 slidably mounted on its end, retained by a pin 39 and held in extended relation by a spring 41. The plunger is preferably an extension of the core of a magnetic starting switch for actuating the starter drive, but may be a manually or magnetically operated plunger independent of the starting switch if so desired. A latch ring 42 of suitable material such as fiber is journalled on the reduced end portion of the barrel 18, being held against the shoulder 19 by means of a split lock ring 43. The latch ring is provided with external depressions 44 for receiving the end 38 of the plunger when the drive is in operative position as shown in Fig. 2, and thereby provides a stop for limiting the demeshing movement of the barrel when the engine overruns, as shown in Fig. 3.

In the operation of the drive, starting with the parts in the positions illustrated in Fig. 1, energization of the starting motor causes rotation of the power shaft 1, the plunger 37, 38 being simultaneously projected into frictional engagement with the exterior of the barrel 18 to impede the rotation of the barrel and control nut. Rotation of the power shaft 1 being transmitted through the pin 3 to the screw shaft 2 causes the control nut 4 to travel along the screw shaft to the right, this longitudinal movement causing the rubber block 8 to engage the driving clutch member 13. The clutch assembly, barrel and pinion are thereby moved longitudinally to mesh the pinion with the engine gear 7. When the abutment flange 25 of the barrel 18 is stopped by the adjacent end of the screw shaft 2, further rotation of the screw shaft causes the control nut 4 to press the rubber block 8 against the driving clutch plate 13, thus compressing the clutch members 12, 13 and yieldably transmitting torque to the pinion therethrough until sufficient torque is built up to cause the pinion to rotate the engine gear. If the initial torque due to the impact of engagement and deceleration of the starting motor is greater than a predetermined maximum, the end of the control nut 4 engages the abutment ring 33 thus preventing further compression of the clutch members 12, 13, 14 whereby the clutch is permitted to slip and thus prevent excessive stresses on the parts.

When the engine fires, the acceleration of the pinion 6 by the engine gear 7 is transmitted back through the clutch and rubber block 8 to the control nut 4 which causes the control nut to move back until its motion is arrested by abutment of its flange 5 against the shoulder 19 of the barrel, the backward movement of the barrel being limited by the plunger 37 as shown in Fig. 3. Since the rubber block 8 is attached to the control nut by the abutment 9 and shoulder 11, the rubber block is withdrawn entirely from its engagement with the driving clutch member 13, and the clutch members are thereby permitted to overrun freely except for the frictional drag of the arms 31 of member 29 in the interior of the annulus 22. If the engine fails to continue self-operative, the pinion 6 slows down below the speed of the power shaft 1, and applies a decelerational force to the barrel 18 through the frictional engagement of the member 29. This causes the barrel with the control nut 4 and its associated parts to be returned to cranking positions as shown in Fig. 2 and the cranking operation is resumed. When the engine has become reliably self-operative, the operator withdraws the plunger 37 and deenergizes the starting motor whereupon the parts are returned to idle position by the combined effect of the rotational force transmitted through the member 29 to the barrel 18 and control nut 4, and the pressure of the antidrift spring 27.

If, during the meshing operation, the teeth of the pinion should abut against a tooth of the engine gear as shown in Fig. 4, the longitudinal movement of the barrel 18 is momentarily arrested by the abutment of the clutch assembly 12, 13, 14, 17, against the shoulder 21 of the barrel, whereupon the further travel of the control nut 4 causes the rubber block 8 to compress the clutch members 12, 13 and 14 until sufficient torque is built up to index the pinion into proper registry with the tooth spaces of the engine gear. The expansion of the rubber block 8 then snaps the pinion into initial mesh with the engine gear and meshing and cranking proceed as above set forth.

Although but one embodiment of the invention has been shown and described in detail, it will be understood that other embodiments are possible and that various changes may be made in the design and arrangement of the parts without departing from the spirit of the invention as defined in the claims appended hereto.

What is claimed is:

1. In an engine starter drive a power shaft, a screw shaft fixed thereon, a pinion slidably journalled on the power shaft for movement into and out of mesh with a gear of the engine to be started; a flanged control nut threaded on the screw shaft, a block of elastically deformable material seated on the control nut against the flange, a friction clutch member in the path of movement of the elastic block so as to be engaged thereby, a second friction clutch member fixed to the pinion; means limiting the longitudinal movement of the pinion to define its operative position, a frictional connection from the pinion to the control nut to accelerate the control nut when the pinion overruns the drive, and manually controllable means for limiting the backward movement of the control nut when it overruns the screw shaft.

2. An engine starter drive as set forth in claim 1 including further, spring means holding the clutch members in initial frictional engagement.

3. An engine starter drive as set forth in claim 1 including further, spring means for holding the clutch members in frictional engagement, said control nut having means for engaging the elastic block to draw it out of engagement with the friction clutch.

4. In an engine starter drive a power shaft, a screw shaft fixed thereon, a pinion slidably journalled on the power shaft, a control nut threaded on the screw shaft, and means for actuating the pinion from the control nut including a driving clutch member, a driven clutch member fixed to the pinion, a transmission member of elastically deformable material connected to rotate with the control nut and movable thereby to engage and rotate the driving clutch member, and a barrel member enclosing the control nut and pinion-actuating means and providing a stop for limiting the longitudinal movement of the pinion; the barrel member being slidably but non-rotatably connected to the control nut; and yielding means forming a frictional rotary connection between the barrel and pinion.

5. In an engine starter drive a power shaft, a screw shaft fixed thereon, a pinion slidably journalled on the power shaft, a control nut threaded on the screw shaft, and means for actuating the pinion from the control nut including a driving clutch member, a driven clutch member fixed to the pinion, a transmission member of elastically deformable material connected to rotate with the control nut and movable thereby to engage and rotate the driving clutch member, and a barrel member enclosing the control nut and pinion-actuating means and providing a stop for limiting the longitudinal movement of the pinion; and means for moving the transmission member out of contact with the driving clutch member when the pinion overruns the drive.

6. In an engine starter drive a power shaft, a screw shaft fixed thereon, a pinion slidably journalled on the power shaft, a control nut threaded on the screw shaft, and means for actuating the pinion from the control nut including a driving clutch member, a driven clutch member fixed to the pinion, a transmission member of elastically deformable material connected to rotate with the control nut and movable thereby to engage and rotate the driving clutch member, and a barrel member enclosing the control nut and pinion-actuating means and providing a stop for limiting the longitudinal movement of the pinion; and means for limiting the pressure of the transmission member on the clutch members to a predetermined maximum so as to limit the torque capacity of the clutch.

7. In an engine starter drive a power shaft, a screw shaft fixed thereon, a pinion slidably journalled on the power shaft, a control nut threaded on the screw shaft, and means for actuating the pinion from the control nut including a driving clutch member, a driven clutch member fixed to the pinion, a transmission member of elastically deformable material connected to rotate with the control nut and movable thereby to engage and rotate the driving clutch member, and a barrel member enclosing the control nut and pinion-actuating means and providing a stop for limiting the longitudinal movement of the pinion; said barrel member being provided with an abutment for the control nut; and a manually controllable stop for the barrel to limit the demeshing movement thereof.

JAMES E. BUXTON.

REFERENCES CITED

The following references are of record in the file of this patent:

UNITED STATES PATENTS

| Number | Name | Date |
| --- | --- | --- |
| 2,199,349 | Sekella | Apr. 30, 1940 |
| 2,394,690 | Hood | Feb. 12, 1946 |
| 2,420,283 | Buxton et al. | May 6, 1947 |